United States Patent
Wang et al.

(10) Patent No.: US 9,584,824 B2
(45) Date of Patent: Feb. 28, 2017

(54) METHOD FOR MOTION VECTOR ESTIMATION

(71) Applicant: PEKING UNIVERSITY SHENZHEN GRADUATE SCHOOL, Shenzhen (CN)

(72) Inventors: Ronggang Wang, Shenzhen (CN); Chengzhou Tang, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 328 days.

(21) Appl. No.: 14/401,145

(22) PCT Filed: Jun. 25, 2013

(86) PCT No.: PCT/CN2013/077927
§ 371 (c)(1),
(2) Date: Nov. 14, 2014

(87) PCT Pub. No.: WO2014/000637
PCT Pub. Date: Jan. 3, 2014

(65) Prior Publication Data
US 2015/0131728 A1 May 14, 2015

(30) Foreign Application Priority Data
Jun. 25, 2012 (CN) .......................... 2012 1 0211413

(51) Int. Cl.
*H04N 7/12* (2006.01)
*H04N 11/02* (2006.01)
(Continued)

(52) U.S. Cl.
CPC ........... *H04N 19/513* (2014.11); *H04N 19/54* (2014.11); *H04N 19/56* (2014.11)

(58) Field of Classification Search
None
See application file for complete search history.

(56) References Cited

U.S. PATENT DOCUMENTS

2004/0131266 A1 7/2004 Kondo et al.
2005/0265456 A1 12/2005 Scheffler
(Continued)

FOREIGN PATENT DOCUMENTS

CN 1142728 A 2/1997
CN 102801972 A 11/2012

OTHER PUBLICATIONS

International Search Report from International Application No. PCT/CN2013/077927 dated Oct. 10, 2013.

*Primary Examiner* — Frederick Bailey
*Assistant Examiner* — Talha M Nawaz
(74) *Attorney, Agent, or Firm* — Alston & Bird LLP (57) ABSTRACT

A motion vector estimation method in video encoding: First, a feature point is detected in a video frame. Next, motion estimation is performed on the feature point to obtain a motion vector of the feature point. Next, the feature point is mapped to a feature image block, and the motion vector of the feature point is used as an initial motion vector of the feature image block. Finally, a distance between each image block and the feature image block is calculated, motion estimation is performed on the image blocks in an ascending order of the distances between the image blocks and the feature image block, and an obtained motion vector of an image block is used as an initial motion vector of an image block that is adjacent to the image block and has not undergone motion estimation, until motion estimation is completed for the image blocks in the entire video frame. The method can make an improvement to a conventional motion estimation method, mitigate influence of local opti- (Continued)

mization on a search method, and increase the accuracy of a motion vector obtained through motion estimation.

16 Claims, 5 Drawing Sheets

(51) Int. Cl.
  *H04N 11/04* (2006.01)
  *H04N 19/513* (2014.01)
  *H04N 19/56* (2014.01)
  *H04N 19/54* (2014.01)

(56) References Cited

U.S. PATENT DOCUMENTS

| 2009/0160957 A1* | 6/2009 | Deng | G06T 7/2026 348/208.99 |
| 2011/0069237 A1* | 3/2011 | Wang | H04N 5/145 348/699 |
| 2014/0286441 A1* | 9/2014 | Zhang | H04N 17/004 375/240.27 |

* cited by examiner

METHOD FOR MOTION VECTOR ESTIMATION

BACKGROUND

Technical Field

The present application relates to the field of video encoding, and more particularly to a motion vector estimation method in video encoding.

Related Art

In current mainstream video codec standards (for example, MPEG4, H.264/AVC, and H.264/AVS) and relevant video processing applications (for example, superresolution and frame rate upsampling), most motion estimation methods scan image blocks in a two-dimensional video frame in a scan order from top to bottom and from left to right to search for a corresponding motion vector. Also, during estimation of each image block, a motion vector of an adjacent block in a region on the left of and above the image block is usually used as a spatial reference motion vector, a motion vector of an image block on lower right of a corresponding image block in a previous frame as a time reference motion vector, and then a strategy is adopted to select the most accurate one from reference motion vectors as an initial motion vector of a current image block. By utilizing this method, a motion vector estimated first can be transferred from an upper left image block to an image block in a lower right corner in a scan order from top to bottom and from left to right, so as to achieve an objective of refine a motion vector gradually.

SUMMARY

The present application provides a motion vector estimation method in video encoding, so as to increase the accuracy of a motion estimation result.

The motion vector estimation method includes:

detecting a feature point in a video frame, and performing motion estimation on the feature point to obtain a motion vector of the feature point;

using a window region that has the feature point being the center and has a preset pixel size as a feature block, and using the motion vector of the feature point as a motion vector of the feature block;

dividing the video frame into image blocks, determining whether an overlapping area between an image block in the video frame and the feature block is greater than a preset threshold value, and if yes, determining the corresponding image block as a feature image block;

using a weighted average of motion vectors of feature blocks having an overlapping relationship with the feature image block as an initial motion vector of the feature image block; and calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame.

In the motion vector estimation method provided by the present application, first, a feature point is detected in a video frame; next, motion estimation is performed on the feature point to obtain a motion vector of the feature point; next, the feature point is mapped to a feature image block, and the motion vector of the feature point is used as an initial motion vector of the feature image block; finally, a distance between each image block and the feature image block is calculated, motion estimation is performed on the image blocks in an ascending order of the distances between the image blocks and the feature image block, and an obtained motion vector of an image block is used as an initial motion vector of an image block that is adjacent to the image block and has not undergone motion estimation, until motion estimation is completed for the image blocks in the entire video frame. In the method, a feature image block having a clear feature is found first to perform estimation to obtain a more accurate motion vector, the accurate motion vector is then transferred to other image blocks and is used as an initial motion vector of the other image blocks, so as to make an improvement to a conventional motion estimation method, mitigate influence of local optimization on a search method, and increase the accuracy of a motion vector obtained through motion estimation.

BRIEF DESCRIPTION OF THE DRAWINGS

The present disclosure will become more fully understood from the detailed description given herein below for illustration only, and thus are not limitative of the present disclosure, and wherein.

Detailed illustration is further provided below with reference to the accompanying drawings and specific implementation manners.

DETAILED DESCRIPTION

When motion estimation is performed on an image block in video encoding, in a video frame, motion vectors obtained through estimation on image blocks at different positions have different degrees of accuracy. A motion vector obtained through estimation on an image block having a clear feature is usually more accurate than a motion vector obtain through estimation on an image block lacking a feature. The reason is that in a motion vector search algorithm a local optimal solution is easily found, whereas influence of such a problem on an image block having a clear feature can be mitigated because the image block is more distinguishable from surrounding image blocks.

By means of retrieval of existing documents and research on application systems, it is found that Edward. Rosten, et al. have made a summary on their work in FASTER and better: A *machine learning approach to corner detection* published in 2010, which proposed a feature point detection method named FAST; also, early in 1988, Harris et al. proposed in *A combined corner and edge detector* a Harris feature point detector that has found wide utilization ever since. The optical flow method proposed by Lucas et al. in *Generalized Image Matching by the Method of Differences* in 1981 is also widely used for its convenience. On the basis of the foregoing work, it is found through a large amount of relevant work and experiments that a result from performing motion estimation on an image block having a feature point is usually more accurate than a motion vector obtained through estimation on other image blocks that do not have a feature point. Therefore, a motion estimation result can be globally optimized by providing a motion vector of an image block having a feature point for surrounding image blocks that do not have a feature point for reference.

Therefore, the inventive concept of the present application is that first an image block having a clear feature is estimated, next an estimated motion vector is used as a reference to initial an image block lacking a feature, so that an accurate estimated motion vector is transferred to surrounding image blocks to mitigate influence of a local minimum value on a motion vector search, and a motion estimation result can be globally optimized by providing a motion vector of an image block having a clear feature to surrounding image blocks for reference.

Figure 1:
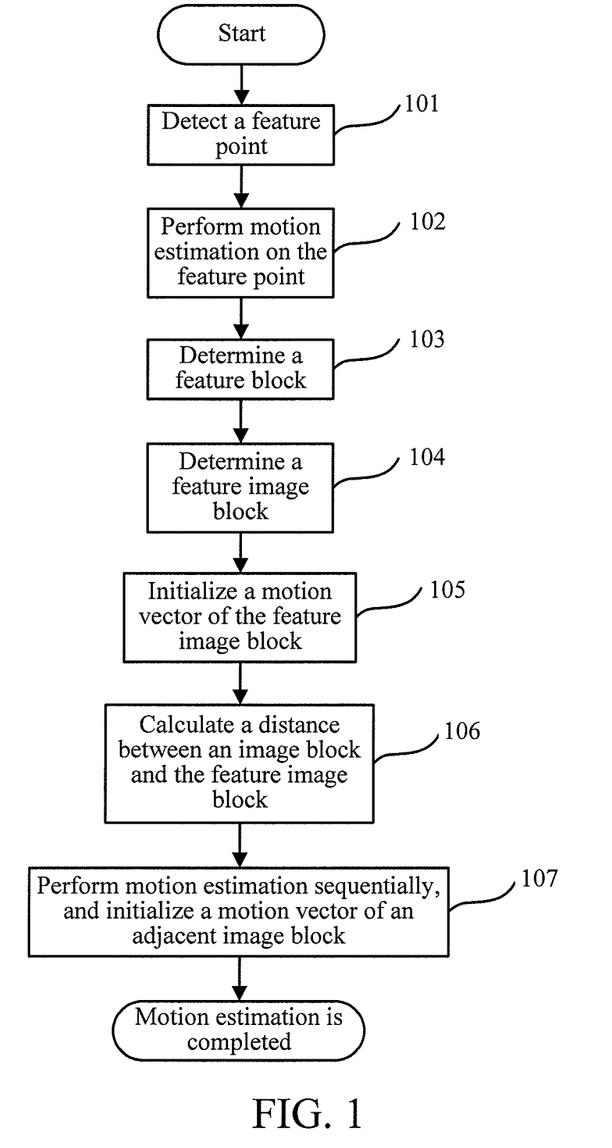
FIG. 1 is a flow chart of a motion estimation method in an embodiment of the present application.

Referring to FIG. 1, a motion vector estimation method provided in this embodiment includes the following steps:

S101: Detect a feature point in a video frame.

S102: Perform motion estimation on the feature point detected in S101 to obtain a motion vector of the feature point.

S103: Use a window region that has the feature point being the center and has a preset pixel size as a feature block, and use the motion vector of the feature point as a motion vector of the feature block.

S104: Divide the video frame into image blocks, determine whether an overlapping area between an image block in the video frame and the feature block is greater than a preset threshold value, and if yes, determine the corresponding image block as a feature image block.

S105: Initialize a motion vector of the feature image block, and use a weighted average of motion vectors of feature blocks having an overlapping relationship with the feature image block as an initial motion vector of the feature image block.

S106: Calculate a distance between each image block and the feature image block.

S107: Perform motion estimation on the image blocks in an ascending order of the distances between the image blocks and the feature image block, and use an obtained motion vector of an image block as an initial motion vector of an image block that is adjacent to the image block and has not undergone motion estimation, until motion estimation is completed for the image blocks in the entire video frame.

Figure 2:
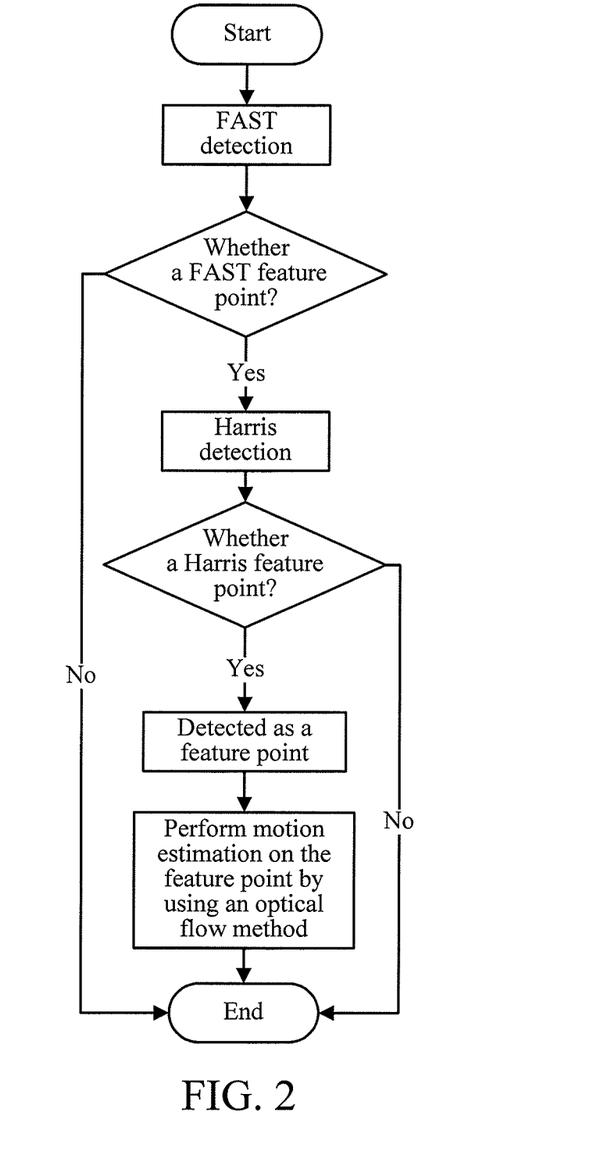
FIG. 2 is a specific flow chart of feature point detection in an embodiment of the present application.

Please refer to FIG. 2. FIG. 2 is a specific flow chart of feature point detection in this embodiment. In S101, this embodiment adopts the FAST detection method to detect a feature point in a video frame. However, although the FAST detection method has a high detection speed and also can produce a desirable result, a feature point obtained through the detection falls at an edge of the video frame, and a motion vector obtained from performing motion estimation on a feature point at an edge is low in accuracy. Therefore, this embodiment further uses a feature point obtained by using the FAST detection method as an input to further detect the feature point in the video frame by using the Harris detection method. Only when one point is detected as a feature point in both the FAST detection method and the Harris detection method, the point is then confirmed as one feature point. In this case, it can be ensured that in a case that the speed is consistent with that in the FAST detection method, feature point detection results at an edge are reduced. In a specific example, in the process of performing FAST detection on a video frame, a detection window having a 9*9 pixel size is adopted to detect a feature point, and to obtain a more robust result, a local non-maximum suppression operation is performed on the initially detected feature point. Next, Harris detection is performed in a window region that has the feature point obtained by using the FAST detection method being the center and has a size of 9*9 pixels, and a determination threshold value is set to be 400. Only when the minimum feature value of a Hessian matrix of pixel values in the range of the window region is greater than the determination threshold value, the point at the center of the window region is confirmed as a needed feature point.

In S102, in this embodiment, in an image pyramid having the same scale as in the feature point detection, a sparse optical flow method is adopted to track the feature point in adjacent frames and motion estimation is performed to obtain the motion vector of the feature point. In a specific example, S102 adopts the Lucas optical flow method.

Figure 3:
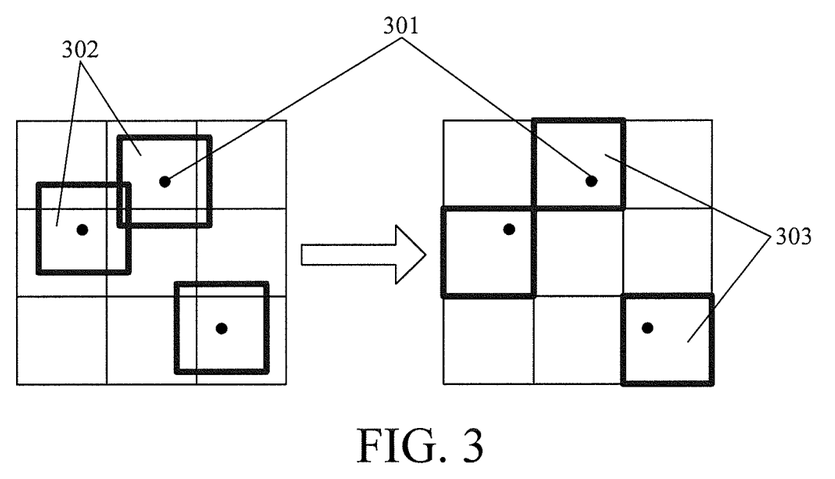
FIG. 3 is a schematic view of mapping relationships between a feature point, a feature block, and a feature image block in an embodiment of the present application.

Referring to FIG. 3, FIG. 3 is a schematic view of mapping relationships between a feature point, a feature block, and a feature image block in this embodiment, in which 301 is a feature point, 302 is a feature block, and 303 is a feature image block.

In S103, in this embodiment, a window region that has the feature point being the center and has a size of 9*9 pixels is used as the feature block, that is, the detection window used in the feature point detection is used as the feature block. In both the processes of FAST detection and Harris detection, the window region is used for detecting a feature point, and therefore the window region includes sufficient feature information.

The video frame is divided into several image blocks. As a one-to-one corresponding relationship does not exist between the feature blocks and the image blocks, mapping needs to be performed to find a feature image block. In S104, an overlapping relationship exists between each feature block and a surrounding image block, to enhance the validity of the obtained feature image block, this embodiment determines a preset threshold value, and only when an overlapping area between the image block and at least has one feature block is greater than a preset threshold value, the image block is confirmed as a feature image block. For example, the preset threshold value for retrieving a feature image block is set to be 13, and only when an overlapping area between an image block and at least one feature block that overlaps with the image block reaches 13, it is confirmed that the image block is a feature image block.

After the feature image block is determined, in S105, a motion vector of the feature image block is initialized. In this embodiment, a sum of overlapping areas of the feature blocks having an overlapping relationship with the feature image block is first calculated, a ratio of the overlapping area between each feature block and the feature image block to the sum of overlapping areas is calculated, the ratio is used as a weight coefficient of the corresponding feature block, and the weighted average of the motion vectors of the feature blocks is used as the initial motion vector of the feature image block. As in both S105 and S104, the overlapping area between the feature block and the feature image block needs to be calculated, in a specific application, the mapping of the feature image block and the calculation for the initialization of the motion vector of the feature image block can be combined.

Figure 4:
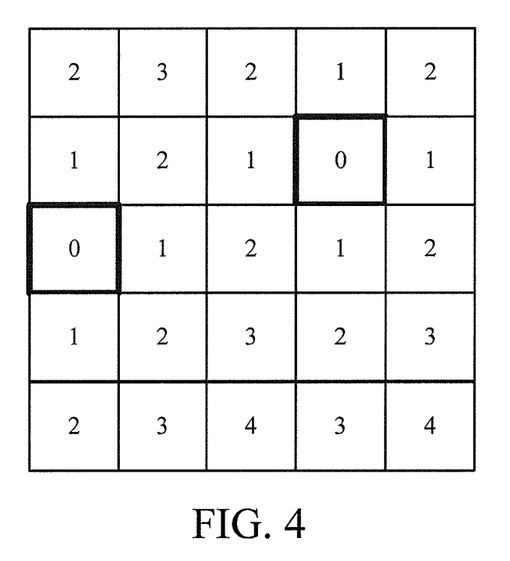
FIG. 4 is a schematic view of a distance between an image block and a feature image block in an embodiment of the present application.

Referring to FIG. 4, FIG. 4 is a schematic view of a distance between an image block and a feature image block. In S106, when the distance between the image block and the feature image block is calculated, it can be determined that for the feature image block, the distance is 0, that is, the distance is minimal for the feature image block. An adjacent image block having one same side as the feature image block has a distance of 1. In a similar manner, the distance between each image block and the feature image block is obtained.

Figure 5:
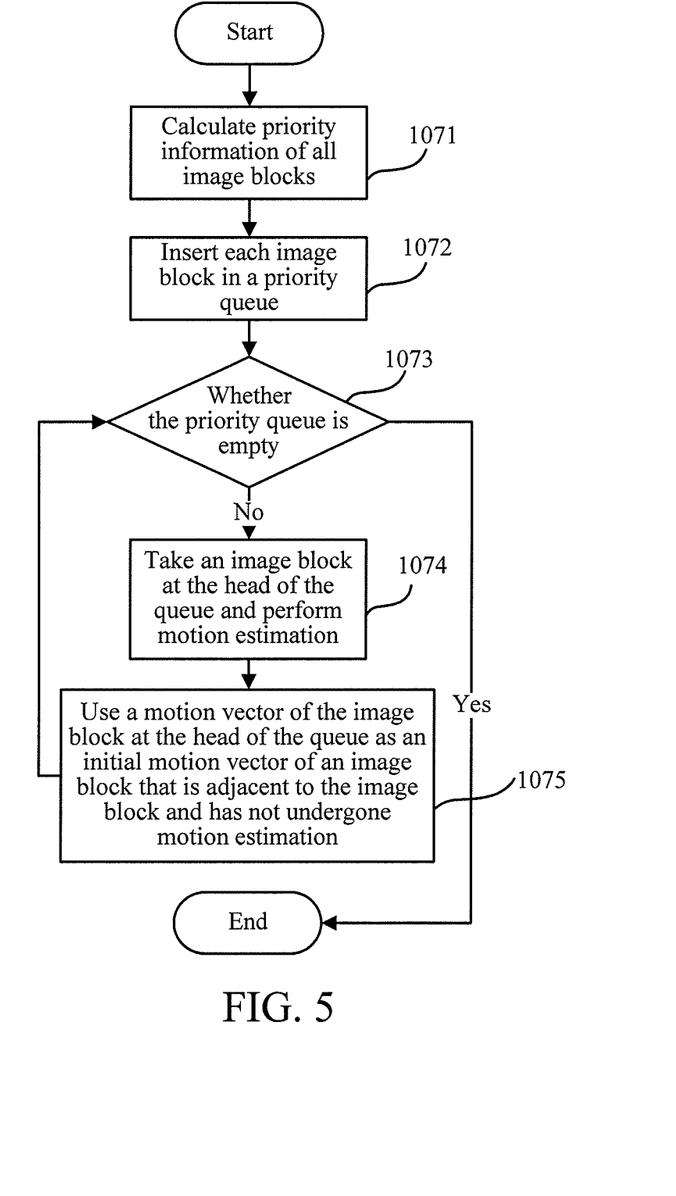
FIG. 5 is a flow chart of motion estimation based on a priority queue in an embodiment of the present application.

After the distance between each image block and the feature image block is calculated, in S107, this embodiment adopts a priority queue manner to perform motion estimation on non-feature image blocks. First, priority information of each image block is calculated according to the distance between the image block and the feature image block, where an image block at a smaller distance from the feature image block has a higher priority. Each image block is inserted in a priority queue according to the priority information, where an image block having a higher priority is inserted at the head of the priority queue. According to the priority queue, motion estimation is performed on the image blocks in the priority queue sequentially, and a motion vector of a current image block is used as an initial motion vector of an image block that is adjacent to the image block and has not undergone motion estimation, until motion estimation is completed for all image blocks in the priority queue. Referring to FIG. 5, FIG. 5 is a flow chart of motion estimation based on a priority queue, and specifically the following steps are included:

S1071: Calculate priority information of each image block according to a distance between each image block and the feature image block. As for the feature image block, the distance is 0, the feature image block has the highest priority, and when the distance from the feature image block is larger, the priority is lower.

S1072: Insert each image block in a priority queue according to the priority information calculated in S1071, where an image block having a high priority is inserted in the front of the priority queue, and an image block having a low priority is inserted in the rear of the priority queue.

It should be understood that a plurality of feature image blocks may exist in a same video frame, and therefore a plurality of image blocks may have a same priority. In this case, in S1072, a conventional scan order of image blocks from top to bottom and from left to right may be adopted, where an image block scanned first is inserted in the front of the priority queue, and an image block scanned later is inserted in the rear of the priority queue.

S1073: Determine whether the priority queue is empty, if yes, it indicates that motion estimation is completed for all image blocks, and end the process, and if not, it indicates an image block that has not undergone motion estimation still exists, and the process turns to S1074.

S1074: Take an image block located at the head of the priority queue and perform motion estimation on the image block to calculate a motion vector of the image block.

S1075: Use a motion vector of a current image block obtained through calculation in S1074 as an initial motion vector of an image block that is adjacent to the image block and has not undergone motion estimation, and then the process turns to step S1073, until all image block accomplish motion estimation.

Figure 6:
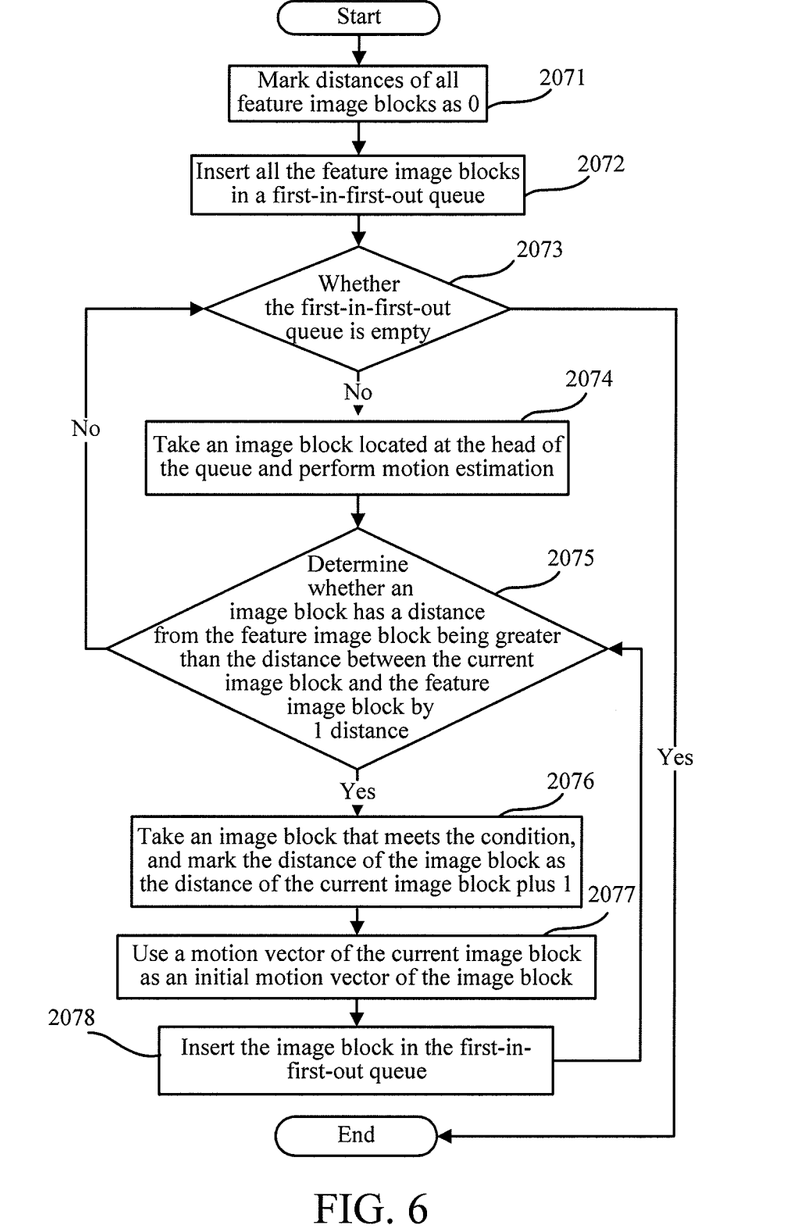
FIG. 6 is a flow chart of motion estimation based on a first-in-first-out queue in an embodiment of the present application.

However, in a motion estimation method based on a priority queue, first priority information of an image block is calculated, all image blocks are then inserted in a priority queue, and finally the image blocks are taken from the queue one by one and motion estimation is performed on each, which is highly consumptive of space and time for a calculation platform; therefore, another embodiment further provides a dynamic motion estimation method based on a first-in-first-out queue to build a queue, and priority calculation and motion estimation are dynamically performed on image blocks. In the premise of achieving the same effect as the motion estimation method based on the priority queue, the consumption of time and space can be greatly reduced. Specifically, in S107, the embodiment adopts a first-in-first-out queue manner to perform motion estimation on non-feature image blocks. First, a distance between each image block and a feature image block is calculated. The feature image block is inserted in a first-in-first-out queue, and an image block at the head of the first-in-first-out queue is taken and motion estimation is performed to obtain a motion vector of the current image block. It is determined whether the current image block has an adjacent image block that has not undergone motion estimation and has a distance from the feature image block being greater than the distance between the current image block and the feature image block, if yes, the motion vector of the current image block is used as an initial motion vector of the adjacent image block, and the adjacent image block is inserted in the first-in-first-out queue, and if not, motion estimation of the current video frame is ended. Referring to FIG. 6, FIG. 6 is a flow chart of motion estimation based on a first-in-first-out queue, and the following steps are specifically included:

S2071: Mark distances of all feature image blocks as 0. In this case, a distance between another image block and the feature image block may also be marked as a maximum distance value.

S2072: Insert all the feature image blocks in a first-in-first-out queue. In this case, a conventional scan order of image blocks from top to bottom and from left to right can be adopted, where a feature image block scanned first is inserted in the front of the first-in-first-out queue, and a feature image block scanned later is inserted in the rear of the first-in-first-out queue.

S2073: Determine whether the first-in-first-out queue is empty, if yes, it indicates that motion estimation is completed for all image blocks, and if not, it indicates that an image block that has not undergone motion estimation still exists, and the process turns to S2074.

S2074: Take an image block located at the head of the first-in-first-out queue and perform motion estimation on the image block to calculate a motion vector of the image block.

S2075: Determine whether an image block has a distance from the feature image block being greater than the distance between the current image block and the feature image block by 1, if yes, the process turns to S2076, and if not, the process turns to S2073.

S2076: Take an image block that meets the condition as determined in S2075, and mark the distance of the image block as the distance of the current image block plus 1.

S2077: Use a motion vector of the current image block as an initial motion vector of the image block.

S2078: Insert the image block in the first-in-first-out queue, and then the process turns to S2075 to determine whether another image block meeting the condition still exists.

In the motion vector estimation method provided in the embodiments of the present application, first, a feature point is detected in a video frame; next, the feature point is mapped to a feature image block, and a sparse optical flow method is adopted to initialize a motion vector of the feature image block; finally, a priority queue or first-in-first-out queue is built to perform motion estimation on the feature image block, so as to transfer the motion vector of the feature image block to another image block for use as an initial motion vector according to a distance between the image block and the feature image block. The method can find a feature image block having a clear feature to obtain a more accurate motion vector through estimation, and then transfer the accurate motion vector to another image block for use as an initial motion vector of the other image block, so as to make an improvement to a conventional motion estimation method, mitigate influence of local optimal on a search method, and increase the accuracy of a motion vector obtained through motion estimation.

A person skilled in the art can understand that all or a part of steps in the methods in the foregoing implementation manners may be implemented by a program instructing relevant hardware. The program may be stored in a computer readable storage medium, and the storage medium may include: a read-only memory, a random access memory, a magnetic disk or an optical disc, and the like.

The content above further illustrates the present application in detail with reference to specific implementation manners, and it should not be considered that the specific implementation of the present application is only limited to these illustrations. A person of ordinary skill in the art of the present application may further make several simple derivations or replacements without departing from the inventive concept of the present application.

What is claimed is:

1. A motion vector estimation method, comprising:
    detecting a feature point in a video frame, and performing motion estimation on the feature point to obtain a motion vector of the feature point;
    using a window region that has the feature point being the center and has a preset pixel size as a feature block, and using the motion vector of the feature point as a motion vector of the feature block;
    dividing the video frame into image blocks, determining whether an overlapping area between an image block in the video frame and the feature block is greater than a preset threshold value, and if yes, determining the corresponding image block as a feature image block;
    using a weighted average of motion vectors of feature blocks having an overlapping relationship with the feature image block as an initial motion vector of the feature image block; and
    calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame,
    wherein the using a weighted average of motion vectors of feature blocks having an overlapping relationship with the feature image block as an initial motion vector of the feature image block comprises: calculating a sum of overlapping areas of the feature blocks having an overlapping relationship with the feature image block, calculating a ratio of an overlapping area between each feature block and the feature image block to the sum of overlapping areas, using the ratio as a weight coefficient, and using the weighted average of the motion vectors of the feature blocks as the initial motion vector of the feature image block.

2. The method according to claim 1, wherein the detecting a feature point in a video frame comprises detecting a feature point in the video frame by using the FAST detection method.

3. The method according to claim 2, after the detecting a feature point in the video frame by using the FAST detection method, further comprising: using the feature point detected by using the FAST detection method as an input to further detect the feature point in the video frame by using the Harris detection method.

4. The method according to claim 1, wherein the performing motion estimation on the feature point to obtain a motion vector of the feature point comprises: performing motion estimation on the feature point to obtain the motion vector of the feature point by using a sparse optical flow method.

5. The method according to claim 1, wherein the calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame comprises:
    calculating the distance between each image block and the feature image block; calculating priority information of each image block, wherein an image block at a smaller distance from the feature image block has a higher priority; inserting each image block in a priority queue according to the priority information, wherein an image block having a higher priority is inserted at the head of the priority queue; performing motion estimation on the image blocks in the priority queue sequentially according to the priority queue, and using a motion vector of a current image block as an initial motion vector of an image block that is adjacent to the image block and has not undergone motion estimation, until motion estimation is completed for all image blocks in the priority queue.

6. The method according to claim 1, wherein the calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame comprises:
    calculating the distance between each image block and the feature image block; inserting the feature image block in a first-in-first-out queue, and performing motion estimation on an image block at the head of the first-in-first-out queue to obtain a motion vector of a current image block; and determining whether an adjacent image block of the current image block has not undergone motion estimation and has a distance from the feature image block being greater than the distance between the current image block and the feature image block, if yes, using the motion vector of the current image block as the initial motion vector of the adjacent image block, and inserting the adjacent image block in the first-in-first-out queue, and if not, ending motion estimation of the current video frame.

7. The method according to claim 2, wherein the calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame comprises:

calculating the distance between each image block and the feature image block; inserting the feature image block in a first-in-first-out queue, and performing motion estimation on an image block at the head of the first-in-first-out queue to obtain a motion vector of a current image block; and determining whether an adjacent image block of the current image block has not undergone motion estimation and has a distance from the feature image block being greater than the distance between the current image block and the feature image block, if yes, using the motion vector of the current image block as the initial motion vector of the adjacent image block, and inserting the adjacent image block in the first-in-first-out queue, and if not, ending motion estimation of the current video frame.

8. The method according to claim 3, wherein the calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame comprises:

calculating the distance between each image block and the feature image block; inserting the feature image block in a first-in-first-out queue, and performing motion estimation on an image block at the head of the first-in-first-out queue to obtain a motion vector of a current image block; and determining whether an adjacent image block of the current image block has not undergone motion estimation and has a distance from the feature image block being greater than the distance between the current image block and the feature image block, if yes, using the motion vector of the current image block as the initial motion vector of the adjacent image block, and inserting the adjacent image block in the first-in-first-out queue, and if not, ending motion estimation of the current video frame.

9. The method according to claim 4, wherein the calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame comprises:

calculating the distance between each image block and the feature image block; inserting the feature image block in a first-in-first-out queue, and performing motion estimation on an image block at the head of the first-in-first-out queue to obtain a motion vector of a current image block; and determining whether an adjacent image block of the current image block has not undergone motion estimation and has a distance from the feature image block being greater than the distance between the current image block and the feature image block, if yes, using the motion vector of the current image block as the initial motion vector of the adjacent image block, and inserting the adjacent image block in the first-in-first-out queue, and if not, ending motion estimation of the current video frame.

10. The method according to claim 1, wherein the calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame comprises:

calculating the distance between each image block and the feature image block; inserting the feature image block in a first-in-first-out queue, and performing motion estimation on an image block at the head of the first-in-first-out queue to obtain a motion vector of a current image block; and determining whether an adjacent image block of the current image block has not undergone motion estimation and has a distance from the feature image block being greater than the distance between the current image block and the feature image block, if yes, using the motion vector of the current image block as the initial motion vector of the adjacent image block, and inserting the adjacent image block in the first-in-first-out queue, and if not, ending motion estimation of the current video frame.

11. The method according to claim 2, wherein the calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame comprises:

calculating the distance between each image block and the feature image block; calculating priority information of each image block, wherein an image block at a smaller distance from the feature image block has a higher priority; inserting each image block in a priority queue according to the priority information, wherein an image block having a higher priority is inserted at the head of the priority queue; performing motion estimation on the image blocks in the priority queue sequentially according to the priority queue, and using a motion vector of a current image block as an initial motion vector of an image block that is adjacent to the image block and has not undergone motion estimation, until motion estimation is completed for all image blocks in the priority queue.

12. The method according to claim 3, wherein the calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame comprises:

calculating the distance between each image block and the feature image block; calculating priority information of each image block, wherein an image block at a smaller distance from the feature image block has a higher priority; inserting each image block in a priority queue according to the priority information, wherein an image block having a higher priority is inserted at the head of the priority queue; performing motion estimation on the image blocks in the priority queue sequentially according to the priority queue, and using a motion vector of a current image block as an initial motion vector of an image block that is adjacent to the image block and has not undergone motion estimation, until motion estimation is completed for all image blocks in the priority queue.

13. The method according to claim 4, wherein the calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame comprises:

calculating the distance between each image block and the feature image block; calculating priority information of each image block, wherein an image block at a smaller distance from the feature image block has a higher priority; inserting each image block in a priority queue according to the priority information, wherein an image block having a higher priority is inserted at the head of the priority queue; performing motion estimation on the image blocks in the priority queue sequentially according to the priority queue, and using a motion vector of a current image block as an initial motion vector of an image block that is adjacent to the image block and has not undergone motion estimation, until motion estimation is completed for all image blocks in the priority queue.

14. The method according to claim 1, wherein the calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame comprises:

calculating the distance between each image block and the feature image block; calculating priority information of each image block, wherein an image block at a smaller distance from the feature image block has a higher priority; inserting each image block in a priority queue according to the priority information, wherein an image block having a higher priority is inserted at the head of the priority queue; performing motion estimation on the image blocks in the priority queue sequentially according to the priority queue, and using a motion vector of a current image block as an initial motion vector of an image block that is adjacent to the image block and has not undergone motion estimation, until motion estimation is completed for all image blocks in the priority queue.

15. A motion vector estimation method, comprising:
detecting a feature point in a video frame, and performing motion estimation on the feature point to obtain a motion vector of the feature point;
using a window region that has the feature point being the center and has a preset pixel size as a feature block, and using the motion vector of the feature point as a motion vector of the feature block;
dividing the video frame into image blocks, determining whether an overlapping area between an image block in the video frame and the feature block is greater than a preset threshold value, and if yes, determining the corresponding image block as a feature image block;
using a weighted average of motion vectors of feature blocks having an overlapping relationship with the feature image block as an initial motion vector of the feature image block; and
calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame,
wherein the calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame comprises:

calculating the distance between each image block and the feature image block; calculating priority information of each image block, wherein an image block at a smaller distance from the feature image block has a higher priority; inserting each image block in a priority queue according to the priority information, wherein an image block having a higher priority is inserted at the head of the priority queue; performing motion estimation on the image blocks in the priority queue sequentially according to the priority queue, and using a motion vector of a current image block as an initial motion vector of an image block that is adjacent to the image block and has not undergone motion estimation, until motion estimation is completed for all image blocks in the priority queue.

16. A motion vector estimation method, comprising:
detecting a feature point in a video frame, and performing motion estimation on the feature point to obtain a motion vector of the feature point;
using a window region that has the feature point being the center and has a preset pixel size as a feature block, and using the motion vector of the feature point as a motion vector of the feature block;
dividing the video frame into image blocks, determining whether an overlapping area between an image block in the video frame and the feature block is greater than a preset threshold value, and if yes, determining the corresponding image block as a feature image block;

using a weighted average of motion vectors of feature blocks having an overlapping relationship with the feature image block as an initial motion vector of the feature image block; and calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame, wherein the calculating a distance between each image block and the feature image block, performing motion estimation on the image blocks in an ascending order of the distances between the image blocks and the feature image block, and using an obtained motion vector of an image block as an initial motion vector of an image block that is adjacent to the image block and has not undergone motion estimation, until motion estimation is completed for the image blocks in the entire video frame comprises:

calculating the distance between each image block and the feature image block; inserting the feature image block in a first-in-first-out queue, and performing motion estimation on an image block at the head of the first-in-first-out queue to obtain a motion vector of a current image block; and determining whether an adjacent image block of the current image block has not undergone motion estimation and has a distance from the feature image block being greater than the distance between the current image block and the feature image block, if yes, using the motion vector of the current image block as the initial motion vector of the adjacent image block, and inserting the adjacent image block in the first-in-first-out queue, and if not, ending motion estimation of the current video frame.

* * * * *